(12) United States Patent
Sutherland et al.

(10) Patent No.: US 6,536,802 B1
(45) Date of Patent: Mar. 25, 2003

(54) VEHICLE INSTRUMENT PANEL ASSEMBLY

(75) Inventors: Daniel R. Sutherland, Eastpointe, MI (US); Kevin M. Brown, Mesa, AZ (US); Kirk W. Christiansen, Tempe, AZ (US); Dirk Schultz, Schwabisch Gmund (DE); Bryan W. Shirk, Mesa, AZ (US); Timothy A. Swann, Mesa, AZ (US); Eric C. Erike, Mesa, AZ (US); Vincent J. Mramor, Chandler, AZ (US); Roy D. Van Wynsberghe, Mesa, AZ (US)

(73) Assignees: TRW Vehicle Safety Systems Inc., Lyndhurst, OH (US); TRW Occupant Restraint Systems GmbH & Co. KG, Alfdorf (DE); TRW Inc., Lyndhurst, OH (US)

( * ) Notice: Subject to any disclaimer, the term of this patent is extended or adjusted under 35 U.S.C. 154(b) by 0 days.

(21) Appl. No.: 10/015,116

(22) Filed: Nov. 13, 2001

(51) Int. Cl.$^7$ .................. B60R 21/045; B60R 21/22; B62D 25/14

(52) U.S. Cl. .................. 280/752; 280/732; 280/730.1; 180/90; 296/70

(58) Field of Search .................. 296/70, 37.12, 296/189, 194; 280/732, 752, 730.1; 180/90

(56) References Cited

U.S. PATENT DOCUMENTS

| | | | |
|---|---|---|---|
| 3,951,427 A | * 4/1976 | Wilfert | 280/732 |
| 4,662,649 A | * 5/1987 | Ikeda et al. | 280/752 |
| 5,062,664 A | 11/1991 | Bishop et al. | |
| 5,088,571 A | 2/1992 | Burry et al. | |
| 5,311,960 A | 5/1994 | Kukainis et al. | |
| 5,312,133 A | * 5/1994 | Pietila et al. | 280/752 |
| 5,358,300 A | * 10/1994 | Gray | 296/192 |
| 5,364,159 A | 11/1994 | Kelman et al. | |
| 5,556,153 A | * 9/1996 | Kelman et al. | 296/70 |
| 5,675,216 A | * 10/1997 | Kumar et al. | 313/495 |
| 5,823,602 A | 10/1998 | Kelman et al. | |
| 6,092,836 A | * 7/2000 | Saslecov | 280/730.1 |
| 6,186,542 B1 | * 2/2001 | Enders et al. | 280/743.1 |
| 6,345,837 B1 | * 2/2002 | Warnez et al. | 280/728.3 |
| 6,371,551 B1 | * 4/2002 | Hedderly | 296/192 |
| 6,471,242 B2 | * 10/2002 | Schneider | 280/732 |

FOREIGN PATENT DOCUMENTS

JP 2000211456 A * 8/2000

* cited by examiner

Primary Examiner—Paul N. Dickson
Assistant Examiner—Ruth Ilan
(74) Attorney, Agent, or Firm—Tarolli, Sundheim, Covell & Tummino L.L.P.

(57) ABSTRACT

An instrument panel assembly (22) comprises a structural carrier member (30) which is formed as one piece and has a first section (40) defining a first chamber (54) for receiving and supporting a first component (110). The structural carrier member (30) has a second section (80) defining a second chamber (92) for receiving and supporting a second component (130). The first component (110) comprises a first inflatable vehicle occupant protection device (114) received in the first chamber (54). The structural carrier member (30) further defines a deployment opening (55) through which the first protection device (114) is inflatable from the first chamber (54). The second component (130) comprises an occupant knee protection device (132) received in the second chamber (92) for helping to protect the vehicle occupant's legs in the event of a vehicle collision.

12 Claims, 3 Drawing Sheets

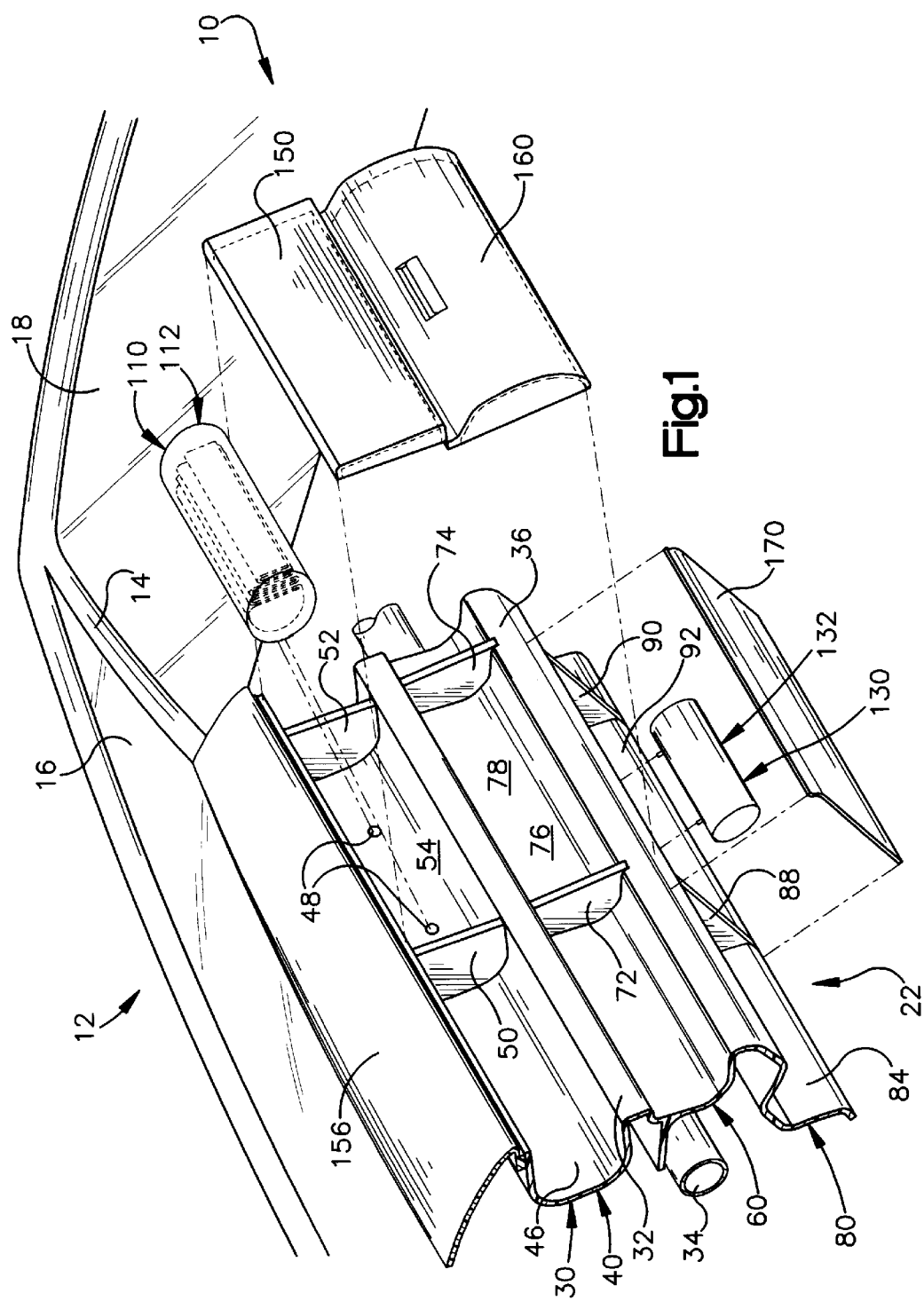

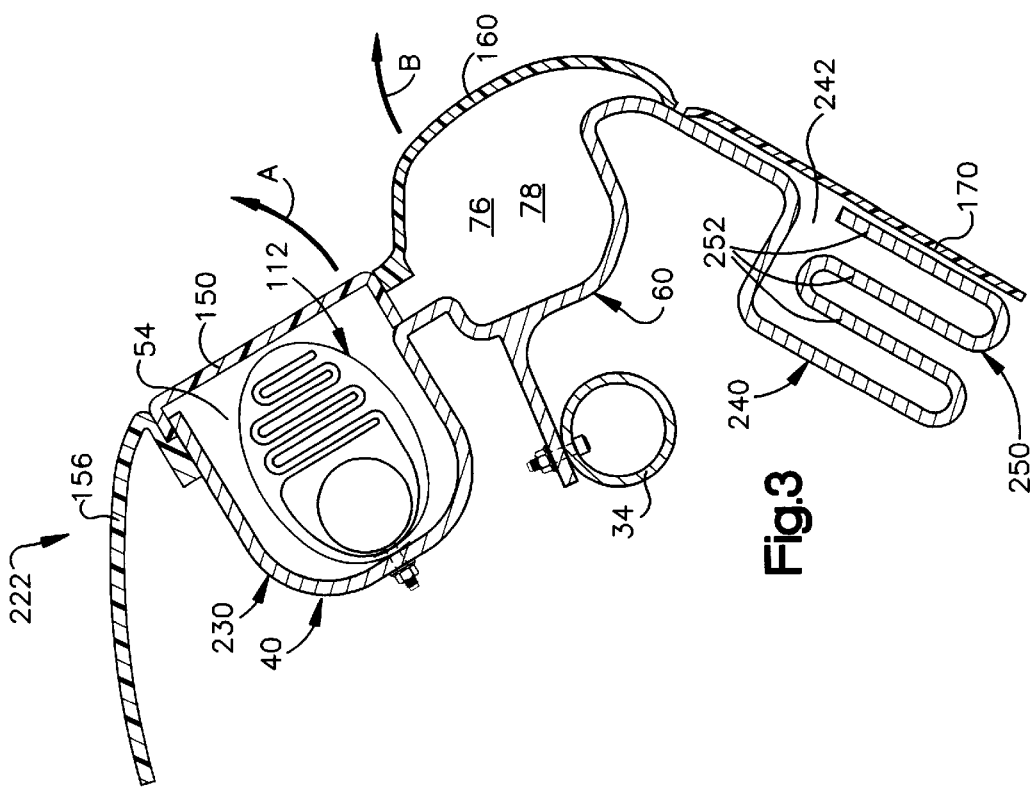
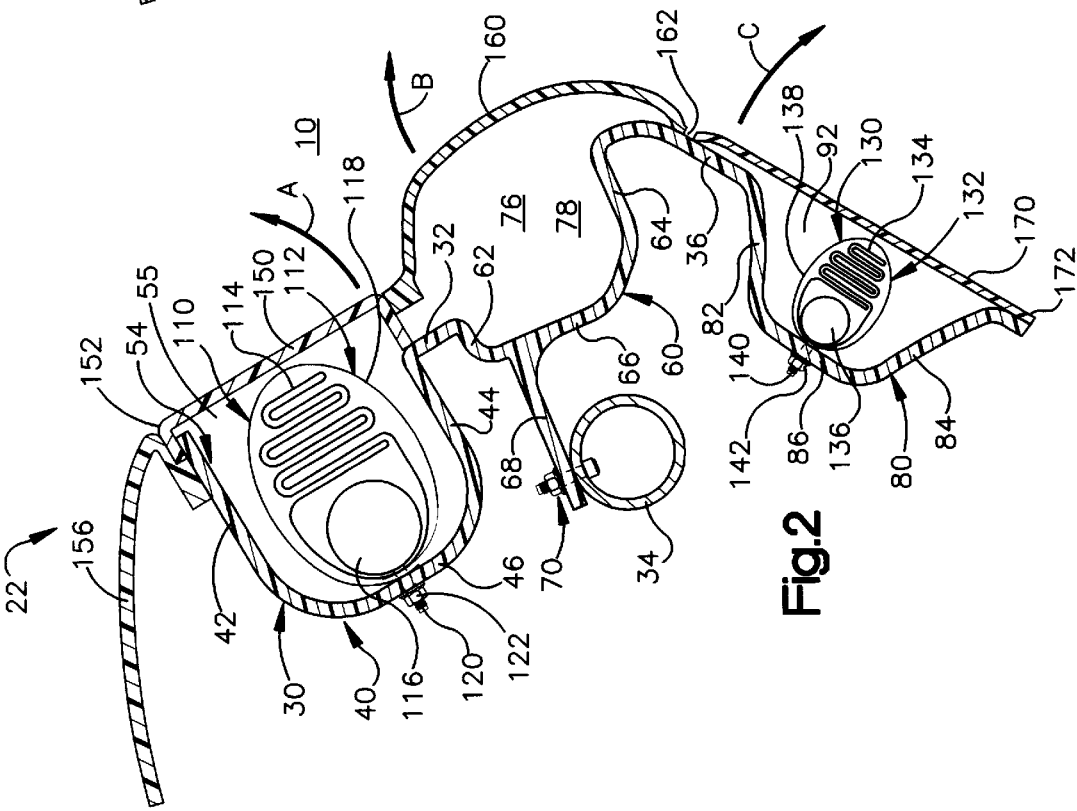

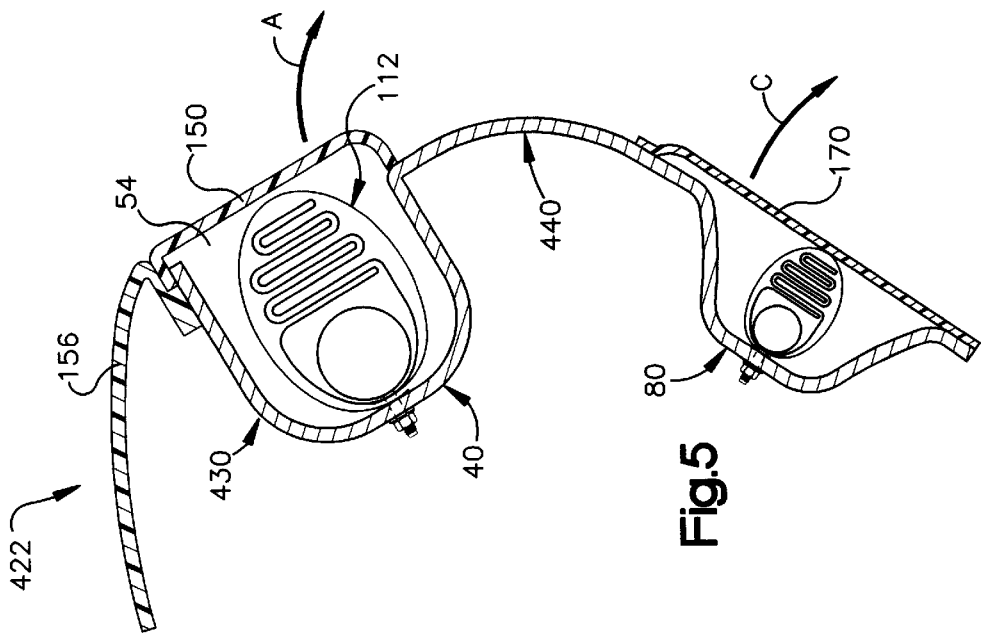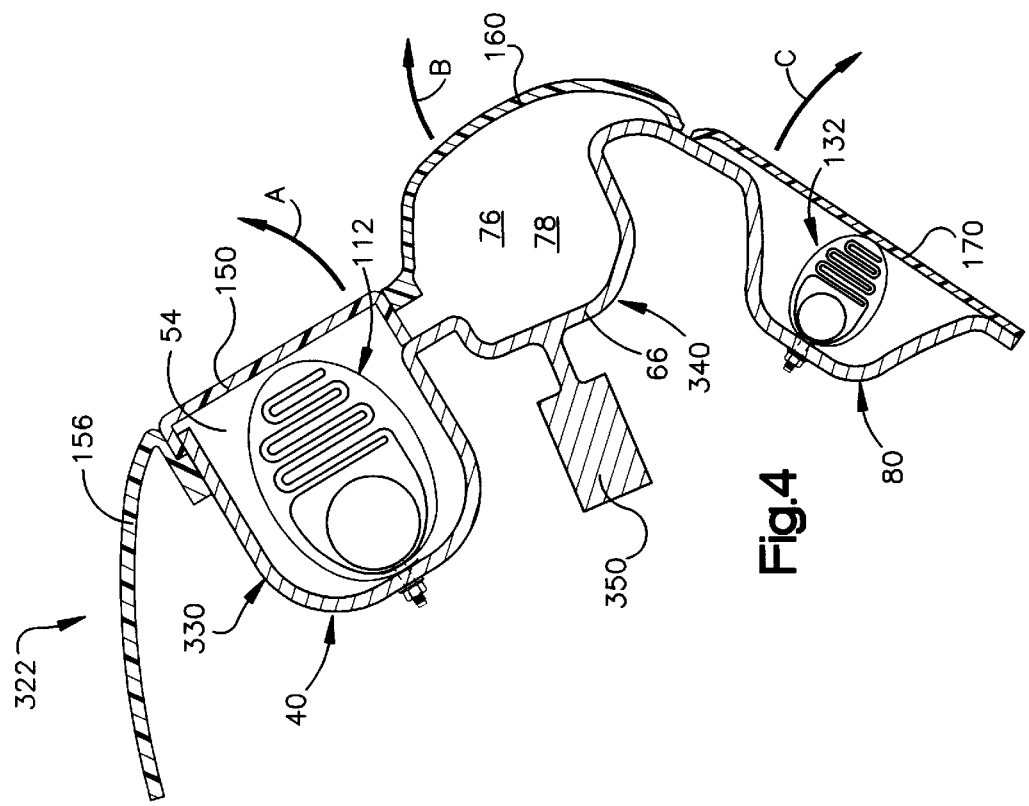

VEHICLE INSTRUMENT PANEL ASSEMBLY

TECHNICAL FIELD

The present invention is directed to an instrument panel assembly for a vehicle, and is particularly directed to an instrument panel assembly having a one-piece structural carrier member for receiving and supporting a variety of components of the instrument panel assembly.

DESCRIPTION OF RELATED ART

A vehicle instrument panel assembly typically comprises a variety of components mounted on an instrument panel carrier structure that extends transversely across the vehicle between the vehicle's A-pillars. The instrument panel carrier structure may be made from several separate sections, such as a structural base section and an air bag module receiving section, that are joined together.

The typical vehicle instrument panel assembly further includes a number of trim pieces, such as a deployment door for an air bag module, that are secured to the instrument panel carrier structure and that cover the various components mounted on the instrument panel carrier structure. Components that are typically mounted on the instrument panel carrier structure include a passenger-side air bag module, an inflatable/deployable knee bolster or an energy-absorbing knee bolster, and a glove box. Each of these components is usually fastened to the instrument panel carrier structure by some form of metal bracketing. Such metal bracketing can include the reaction canister that is found in most passenger-side air bag modules and the reaction plate that is found in most driver-side air bag modules. Some side-impact air bag modules, referred to as "soft-pack" modules, have eliminated the use a metal reaction canister. In addition, several patents exist that describe the use of the instrument panel as the reaction canister.

SUMMARY OF THE INVENTION

The present invention is an instrument panel assembly for a vehicle, comprising a structural carrier member supporting a plurality of components of the instrument panel assembly adjacent the vehicle occupant compartment. The structural carrier member is formed as one piece and has a first section defining a first chamber for receiving and supporting a first component of the instrument panel assembly and a second section defining a second chamber for receiving and supporting a second component of the instrument panel assembly. The first component comprises a first inflatable vehicle occupant protection device received in the first chamber and fastened to the first section of the structural carrier member. The structural carrier member further defines a deployment opening through which the first protection device is inflatable from the first chamber into the vehicle occupant compartment to help protect a vehicle occupant in the event of a vehicle collision. The second component comprises an occupant knee protection device received in the second chamber for helping to protect the vehicle occupant's legs in the event of a vehicle collision.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is an exploded perspective view of a portion of a vehicle having an instrument panel assembly constructed in accordance with a first embodiment of the present invention;

FIG. 2 is a sectional view of the instrument panel assembly of FIG. 1;

FIG. 3 is a sectional view similar to FIG. 2 illustrating an instrument panel assembly in accordance with a second embodiment of the present invention;

FIG. 4 is a sectional view similar to FIG. 2 illustrating an instrument panel assembly in accordance with a third embodiment of the present invention; and FIG. 5 is a sectional view similar to FIG. 2 illustrating an instrument panel assembly in accordance with a fourth embodiment of the present invention.

DETAILED DESCRIPTION OF THE INVENTION

The present invention is directed to an instrument panel assembly for a vehicle. As representative of the present invention, FIG. 1 illustrates an instrument panel assembly 22 that is mounted in or adjacent a portion of an occupant compartment 10 of a vehicle 12. The occupant compartment 10 of the vehicle 12 is defined in part by a pair of oppositely disposed A-pillars 14 (only one of which is shown), a windshield 16, and a passenger-side window 18 of the vehicle.

The instrument panel assembly 22 includes a structural carrier member 30 for mounting components of the instrument panel assembly 22. The structural carrier member 30 extends laterally in the vehicle 12 between the A-pillars 14. The structural carrier member 30 is a one-piece component. In the first embodiment of the invention illustrated in FIGS. 1 and 2, the structural carrier member 30 is injection molded as one piece from a suitable plastic, such as polypropylene or ABS, with a glass or carbon fiber filler.

The structural carrier member 30 (FIG. 2) has an upper section 40, a middle section 60, and a lower section 80. The upper section 40 includes generally parallel first and second side walls 42 and 44 connected by a bottom wall 46. The bottom wall 46 has a pair of openings 48 (FIG. 1) for receiving fasteners. The upper section 40 of the structural carrier member 30 further includes oppositely disposed first and second end walls 50 and 52. The side walls 42 and 44, the end walls 50 and 52, and the bottom wall 46 together define a first chamber 54 in the upper section 40 of the structural carrier member 30. The walls 42, 44, 50 and 52 further define a deployment opening 55.

The middle section 60 of the structural carrier member 30 is located underneath the upper section 40 and is connected with the upper section by a first connecting wall 32 of the structural carrier member 30. The middle section 60 includes generally parallel first and second side walls 62 and 64 connected by a bottom wall 66. A mounting flange 68 projects from the bottom wall 66 in the middle section 60 of the structural carrier member 30. The mounting flange 68 is secured by a plurality of fasteners 70 to a laterally extending structural cross-beam 34 of the vehicle 12.

The middle section 60 of the structural carrier member 30 further includes oppositely disposed first and second end walls 72 and 74 (FIG. 1). The side walls 62 and 64, the end walls 72 and 74, and the bottom wall 66 together define a second chamber 76 in the middle section 60 of the structural carrier member 30. The second chamber 76 forms a glove box 78 in the instrument panel assembly 22.

The lower section 80 of the structural carrier member 30 is located underneath the middle section 60 and is connected with the middle section by a second connecting wall 36 of the structural carrier member. The lower section 80 includes first and second side walls 82 and 84 connected by a bottom wall 86. The bottom wall 86 has a pair of openings (not shown) for receiving fasteners. The lower section 80 of the structural carrier member 30 further includes oppositely disposed first and second end walls 88 and 90 (FIG. 1). The side walls 82 and 84, the end walls 88 and 90, and the bottom wall 86 together define a third chamber 92 in the lower section 80 of the structural carrier member 30.

The assembly 22 further includes a first inflatable vehicle occupant protection device 110 disposed in the first chamber 54 in the structural carrier member 30. In accordance with the first embodiment, the first inflatable vehicle occupant protection device 110 is a passenger-side air bag module 112. The air bag module 112 is a "soft-pack" module and has no reaction canister or mounting bracket. The air bag module 112 comprises an inflatable air bag 114 (FIG. 2), an actuatable inflator 116 for inflating the air bag, and a rupturable covering 118 wrapped around the air bag and the inflator. The covering 118 encloses and protects the air bag 114 and the inflator 116.

The inflator 116 includes a pair of threaded studs 120 that project radially outward from the inflator. The studs 120 extend through the openings 48 in the bottom wall 46 in the upper section 40 of the structural carrier member 30. Nuts 122 are screwed onto the studs 120 to secure the air bag module 112 to the bottom wall 46 in the upper section 40 of the structural carrier member 30. The walls 42, 44, 46, 50 and 52 of the first chamber 54 serve as a reaction canister for the module 112.

The assembly 22 also has a second inflatable vehicle occupant protection device 130, disposed in the third chamber 92 in the structural carrier member 30. In the first embodiment of the invention, which is illustrated in FIGS. 1 and 2, the second inflatable vehicle occupant protection device 130 is an inflatable knee bolster module 132. The knee bolster module 132 is a "soft-pack" module and has no reaction canister or mounting bracket. The knee bolster module 132 comprises an inflatable bolster 134, an actuatable inflator 136 for inflating the bolster, and a rupturable covering 138 wrapped around the bolster and the inflator. The covering 138 encloses and protects the bolster 134 and the inflator 136.

The inflator 136 includes a pair of threaded studs 140 that project radially outward from the inflator. The studs 140 extend through the openings in the bottom wall 86 in the lower section 80 of the structural carrier member 30. Nuts 142 are screwed onto the studs 140 to secure the knee bolster module 132 to the bottom wall 86 in the lower section 80 of the structural carrier member 30. The walls 82–90 of the third chamber 92 serve as a reaction canister for the module 132.

The assembly 22 further includes first and second deployment doors 150 and 170, and a glove box door 160, which attach to the structural carrier member 30. An upper edge 152 of the first deployment door 150 is secured, in a manner not shown, to the structural carrier member 30 over the first chamber 54 in the upper section 40. The first deployment door 150 covers the air bag module 112 in the first chamber 54. The first deployment door 150 is pivotable about the upper edge 152 in the direction of the arrow A, upon inflation of the air bag 114, to allow the air bag to deploy into the occupant compartment 10 through the deployment opening 55 to help protect the vehicle occupant's head and torso from injury in the event of a vehicle collision. An instrument panel trim piece 156 extends across the top of the structural carrier member 30 and adjoins the upper edge 152 of the first deployment door 150.

A lower edge 162 of the glove box door 160 is pivotally mounted, in a manner not shown, to the structural carrier member 30. The glove box door 160 covers the glove box 78 formed by the second chamber 76 in the middle section 60 of the structural carrier member 30. The glove box door 160 is pivotable about the lower edge 162, in the direction of the arrow B, to allow access to the glove box 78.

The second deployment door 170 has a lower edge 172 that is secured, in a manner not shown, to the structural carrier member 30 over the third chamber 92 in the lower section 80. The second deployment door 170 covers the knee bolster module 132 in the third chamber 92. The second deployment door 170 is pivotable about the lower edge 172 in the direction of the arrow C, upon inflation of the knee bolster 134. This allows the knee bolster to deploy into the occupant compartment 10 to help protect the vehicle occupant's legs from injury in the event of a vehicle collision.

FIG. 3 illustrates an instrument panel assembly 222 constructed in accordance with a second embodiment of the present invention. In the second embodiment of FIG. 3, reference numbers that are the same as those used in the first embodiment of FIGS. 1 and 2 are used to designate parts that are similar to parts in the first embodiment.

The instrument panel assembly 222 (FIG. 3) includes a structural carrier member 230. The structural carrier member 230 is a one-piece component made from a homogeneous metal material, such as extruded aluminum. Alternatively, the structural carrier member 230 could be die-cast out of aluminum or magnesium, or could be made from plastic.

The structural carrier member 230 has a lower section 240 that includes an energy absorbing portion 250 for helping to protect a vehicle occupant's legs in the event of a vehicle collision. The energy absorbing portion 250 is formed as one piece with the other portions of the carrier structure 230. The energy absorbing portion 250 is located within a third chamber 242 defined in the lower section 240. The energy absorbing portion 250 comprises a plurality of collapsible walls 252 that are engageable by the occupant's legs in a vehicle collision to absorb energy. The energy absorbing portion 250 is covered by a deflectable trim piece 170.

FIG. 4 illustrates an instrument panel assembly 322 constructed in accordance with a third embodiment of the present invention. In the third embodiment of FIG. 4, reference numbers that are the same as those used in the first embodiment of FIGS. 1 and 2 are used to designate parts that are similar to parts in the first embodiment.

The instrument panel assembly 322 (FIG. 4) includes a structural carrier member 330. The structural carrier member 330 is a one-piece component made from a homogeneous metal material, such as extruded aluminum. Alternatively, the structural carrier member could be die-cast out of aluminum or magnesium, or could be made from plastic.

The structural carrier member 330 has a middle section 340 that includes a cross-beam 350 formed as one piece with the structural carrier member. The cross-beam 350 extends from the bottom wall 66 in the middle section 60 of the structural carrier member 330 and provides structural rigidity for the instrument panel assembly 322 in the occupant compartment 10. The cross-beam 350 has oppositely disposed ends (not shown) that are bolted or welded to the A-pillars of the vehicle 12.

FIG. 5 illustrates an instrument panel assembly 422 constructed in accordance with a fourth embodiment of the present invention. In the fourth embodiment of FIG. 5, reference numbers that are the same as those used in the first embodiment of FIGS. 1 and 2 are used to designate parts that are similar to parts in the first embodiment.

The instrument panel assembly 422 includes a structural carrier member 430. The structural carrier member 430 is a one-piece component made from a homogeneous metal material, such as extruded aluminum. Alternatively, the structural carrier member could be die-cast out of aluminum or magnesium, or could be made from plastic.

The structural carrier member 430 has a middle section 440 that omits the second chamber 76 found in the previous embodiments. Thus, the instrument panel assembly 422 according to the fourth embodiment does not have a glove box.

Each of the embodiments of the present invention disclosed above provides a reduction in the number of parts used in the instrument panel assembly. By reducing the number of parts used in the instrument panel assembly, manufacturing time and expense, as well as assembly time and expense, are reduced.

From the above description of the invention, those skilled in the art will perceive improvements, changes and modifications. For example, it should be understood that a deployable knee bolster, known in the art, could be used in place of the inflatable knee bolster 134 in the third chamber 92 (FIG. 2). Such improvements, changes and modifications within the skill of the art are intended to be covered by the appended claims.

Having described the invention, we claim:

1. An instrument panel assembly for a vehicle, comprising:

a structural carrier member supporting a plurality of components of the instrument panel assembly adjacent the vehicle occupant compartment;

said structural carrier member being formed as one piece and having a first section defining a first chamber for receiving and supporting a first component of the instrument panel assembly and a second section defining a second chamber for receiving and supporting a second component of said instrument panel assembly;

said first component comprising a first inflatable vehicle occupant protection device received in said first chamber and fastened to said first section of said structural carrier member, said structural carrier member further defining a deployment opening through which said first protection device is inflatable from said first chamber into the vehicle occupant compartment to help protect a vehicle occupant in the event of a vehicle collision;

said second component comprising an occupant knee protection device received in said second chamber for helping to protect the vehicle occupant's legs in the event of a vehicle collision.

2. An instrument panel assembly as set forth in claim 1 wherein said knee protection device is a soft pack air bag received in said second chamber of said structural carrier member and inflatable from said second chamber into the vehicle occupant compartment to help protect the vehicle occupant's legs in the event of a vehicle collision.

3. An instrument panel assembly as set forth in claim 1 wherein said knee protection device is an energy absorbing portion of said structural carrier member, said energy absorbing portion being formed as one piece with said instrument panel carrier structure and being received in said second chamber of said structural carrier member.

4. The apparatus of claim 1 wherein said knee protection device comprises an inflatable knee bolster for helping to protect the vehicle occupant's legs in the event of a vehicle collision.

5. The apparatus of claim 1 wherein said structural carrier member is made of metal.

6. The apparatus of claim 1 wherein said structural carrier member is made of a plastic material.

7. The apparatus of claim 1 wherein said structural carrier member further includes a cross-beam.

8. The apparatus of claim 1 wherein said first inflatable vehicle occupant protection device comprises a passenger-side air bag module.

9. The apparatus of claim 1 wherein said first inflatable vehicle occupant protection device includes a plurality of threaded studs that extend through openings in said first section of said structural carrier member, said apparatus further comprising a plurality of nuts that screw onto said plurality of threaded studs to fasten said inflatable vehicle occupant protection device to said first section.

10. The apparatus of claim 1 further comprising a glove box door pivotally mounted to said structural carrier member, said structural carrier member further including a third section defining a third chamber, said third chamber comprising a glove box in the vehicle instrument panel assembly, said glove box being covered by said glove box door.

11. The apparatus of claim 1 wherein said first inflatable vehicle occupant protection device comprises a passenger-side air bag module, said first inflatable vehicle occupant protection device includes a plurality of threaded studs that extend through openings in said first section of said structural carrier member, said apparatus further comprising a plurality of nuts that screw onto said plurality of threaded studs to fasten said inflatable vehicle occupant protection device to said first section.

12. The apparatus of claim 11 further comprising a glove box door pivotally mounted to said structural carrier member, said structural carrier member further including a third section defining a third chamber, said third chamber comprising a glove box in the vehicle instrument panel assembly, said glove box being covered by said glove box door.

* * * * *